(12) United States Patent
Rehra et al.

(10) Patent No.: US 7,881,840 B2
(45) Date of Patent: Feb. 1, 2011

(54) LEVEL CONTROL SYSTEM FOR A MOTOR VEHICLE

(75) Inventors: Günter Rehra, Barsinghausen (DE); Marc Nettelmann, Garbsen (DE)

(73) Assignees: Continental Aktiengesellschaft, Hannover (DE); Continental Teves AG & Co. OHG, Frankfurt (DE)

( * ) Notice: Subject to any disclaimer, the term of this patent is extended or adjusted under 35 U.S.C. 154(b) by 608 days.

(21) Appl. No.: 11/919,458

(22) PCT Filed: Feb. 21, 2006

(86) PCT No.: PCT/EP2006/001529

§ 371 (c)(1),
(2), (4) Date: Oct. 29, 2007

(87) PCT Pub. No.: WO2006/114146

PCT Pub. Date: Nov. 2, 2006

(65) Prior Publication Data

US 2009/0082921 A1    Mar. 26, 2009

(30) Foreign Application Priority Data

Apr. 28, 2005   (DE) ................... 10 2005 019 783

(51) Int. Cl.
*B60G 17/018*    (2006.01)
*B60G 11/27*    (2006.01)
*G01M 17/04*    (2006.01)

(52) U.S. Cl. ...................... 701/37; 280/5.501
(58) Field of Classification Search .............. 701/37; 73/11.04; 280/124.157
See application file for complete search history.

(56) References Cited

U.S. PATENT DOCUMENTS

| 2,782,637 | A |   | 2/1957 | Scheldorf |
| 4,673,193 | A | * | 6/1987 | Kobayashi et al. ........ 280/6.157 |
| 4,730,843 | A | * | 3/1988 | Tanaka et al. ............ 280/5.506 |
| 4,881,753 | A | * | 11/1989 | Shima et al. ............. 280/6.157 |
| 6,374,193 | B1 |   | 4/2002 | Kutscher et al. |

FOREIGN PATENT DOCUMENTS

JP         61190182        1/1987
WO    WO 2004 083801      9/2004

* cited by examiner

*Primary Examiner*—Khoi Tran
*Assistant Examiner*—Rodney King

(57) ABSTRACT

Disclosed is a level control system in which the operational readiness of the compressor (2) is tested by connecting the pressure sensor (10) to the output (6) of the compressor (2) via a compressed-air sensor line (8). All other compressed-air lines that are connected to the output (6) of the compressor (2) are locked by shutting directional control valves (201 to 20*d* and 30). The compressor (2) is then switched on and it is tested how rapidly the pressure increases on the pressure sensor (10). If the increase per interval exceeds a defined threshold value, the compressor is operationally ready.

11 Claims, 3 Drawing Sheets

LEVEL CONTROL SYSTEM FOR A MOTOR VEHICLE

BACKGROUND OF THE INVENTION

The invention relates to a level control system for a motor vehicle, by means of which a vehicle body is spring-suspended relative to at least one vehicle axle and which comprises the following components:
- a compressor with an inlet and an outlet,
- air springs, each of which is connected to the outlet of the compressor via a compressed air line, which may be shut off by a switchable directional control valve,
- at least one pressure sensor, which is connected at least from time to time to the outlet of the compressor via a sensor compressed air line.

Such level control systems are known from the prior art, e.g. from EP 0 978 397 B1. In the level control system described therein, the air springs are filled solely from the atmosphere or emptied solely thereinto (open level control system). A level control system of the abovementioned type is likewise known from EP 1 243 447 A2, which, in addition to the abovementioned components, has a compressed air accumulator from which the air springs are filled or into which they are emptied (closed level control system). After initial fitting of a level control system in the motor vehicle, the air springs thereof are filled with the assistance of the compressor. In the case of a closed level control system, this takes place for instance in that first of all the compressed air accumulator is filled via an external connection of the level control system. Then, compressed air is transferred from the compressed air accumulator into the individual air springs by means of the compressor. It is assumed during this operation that the compressor is correctly connected and operating faultlessly. Faulty connection of the compressor is therefore only recognized after a time delay, specifically from the fact that the air springs cannot be filled as desired. The time delay may amount to up to a minute or more, which is a long period of time when it comes to identifying a fault on a modern production line. It should additionally be noted that faulty installation of the compressor is identified only at an advanced point on the production line. This may be disadvantageous with regard to further assembly on the production line.

Later on, damage to the compressor may arise during servicing or repair of a level control system. In this instance too, there is no quickly performable test for checking that the functional soundness of the compressor is not reduced.

The object of the invention is to provide a level control system in which the compressor may be checked simply in a short time for problem-free readiness for service.

SUMMARY OF THE INVENTION

The object is achieved by checking the readiness for service of the compressor as follows:
- the pressure sensor is connected to the outlet of the compressor via the sensor compressed air line,
- the compressed air lines, which connect the air springs to the outlet of the compressor, are shut off,
- the compressor is switched on,
- the pressure increase at the pressure sensor is measured,
- checking is performed as to whether the pressure increase per unit time exceeds a predetermined threshold value, the compressor being ready for service if this is the case,
- after checking for readiness for service the compressor is switched off.

The basic concept of the invention is that every compressed air line extending from the outlet of the compressor (with the exception of the sensor compressed air line) is shut off by means of a switchable directional control valve while the compressor is being checked for readiness for service. The result of this is that compressed air lines extending from the outlet of the compressor are not connected to a large air volume, such as for example an air spring, the atmosphere or a compressed air accumulator, and consequently pressure builds up rapidly at the pressure sensor if the compressor is operating correctly.

One advantage of the invention is that checking of the readiness for service of the compressor may be performed in a conventional level control system without additional components. A further advantage is that checking may be carried out in only a very short time, since the sensor compressed air line comprises only a very small air volume and thus the pressure therein and thus at the pressure sensor rises very rapidly if the compressor is operating properly. A further advantage of the invention is that damage to the compressor during checking is reliably prevented. This is attributable to the fact that the compressor delivers only for a short time "against the closed directional control valves" and severe heating of the compressor with the concomitant damage thus does not arise.

The further development of the invention describes a closed level control system, which has a large air volume in the form of a compressed air accumulator. The advantage of the further development is that, during checking of the readiness for service of the compressor, the compressed air line connecting the compressed air accumulator to the outlet of the compressor may be shut off by means of a switchable directional control valve, such that, despite the large air volume of the compressed air accumulator, checking may be carried out in only a short time.

According to a further development of the invention, in each case a compressed air line branches off from the sensor compressed air line for each air spring, it being possible to shut off the former compressed air line with a switchable directional control valve. The sensor compressed air line is thus used as a "master line", from which the compressed air lines to the air springs branch off. The advantage of this further development is that the length of the compressed air lines in the level control system and thus the time needed for checking the readiness for service of the compressor is optimized.

A further development of the invention is characterized in that
- the inlet of the compressor is connected directly to the atmosphere via an atmospheric line, in which a first nonreturn valve opening towards the inlet of the compressor is arranged, and in that
- the compressed air line connecting the compressed air accumulator to the inlet of the compressor ends at a point on the atmospheric line between the first nonreturn valve and the inlet of the compressor and in that
- a second nonreturn valve opening towards the inlet of the compressor is situated in the compressed air line between the compressed air accumulator and the stated point.

The advantage of this further development is that compressed air may be transferred directly into the air springs via the atmospheric line by means of the compressor if the compressed air accumulator is not yet full and exhibits only a low air pressure.

According to a further development of the invention, checking of the readiness for service of the compressor takes place during initial fitting of the level control system. Checking is carried as early as possible. The advantage of this further development is that, even before the air springs are first filled using the compressor, its proper readiness for service is certain.

According to a further development of the invention, checking of the readiness for service of the compressor takes place after each repair or servicing of the level control system. The advantage of the further development is that damage to the compressor during repair or servicing may be identified immediately and remedied.

According to a further development of the invention, checking of the readiness for service of the compressor takes place as soon as it is identified that the motor vehicle in which the level control system is situated has started cross-country driving. Cross-country driving by the motor vehicle may be identified for example from the angle of inclination of the vehicle body or from the gear position (in the case of cross-country driving either a low step-up ratio or even a step-down ratio is established). The advantage of this further development becomes clear if it is considered that before or during cross-country driving the vehicle body is usually raised significantly using the compressor and the compressor is therefore particularly heavily loaded. The advantage of the further development is thus that readiness for service of the compressor is checked at an early stage, such that cross-country driving can be stopped in good time in the case of limited functioning or functional failure of the compressor.

According to a further development of the invention, checking of the readiness for service of the compressor takes place at regular operating intervals of the vehicle (e.g. every 5 to 10 operating hours). The advantage of this further development is that the compressor is checked regularly and therefore the probability of the driver of the motor vehicle being "surprised" by a compressor breakdown is slight.

According to a further development, the duration of the compressor on-time during readiness for service checking is limited to 0.5 to 4 seconds, preferably to 0.5 to 2 seconds. It has been demonstrated that such a short compressor on-time is sufficient for performing the check. This is attributable to the fact that the air volumes into which the compressor delivers during checking are very small, such that, when the compressor is ready for service, a pressure increase arises rapidly at the pressure sensor. The advantage of the further development is that, due to the short compressor on-time, excessive heating of and the resultant damage to the compressor are reliably prevented.

According to a further development of the invention, the control device of the level control system outputs a fault signal if the check finds that the compressor is not ready for service. The advantage of this further development is that the fact that the compressor is not ready for service is indicated and may be remedied immediately.

According to a further development of the invention, the level control system is switched to an emergency operation program if the check finds that the compressor is not ready for service. The emergency operation program is preferably selected such that first of all a normal level of the motor vehicle is established and then no more adjustment takes place in the level control system. If it is impossible to raise the motor vehicle because the compressor is no longer functioning, the emergency operation program may ensure that the motor vehicle is at least not lowered any further if it is already below the normal level. The advantage of the further development is that the level of the motor vehicle is always as close as possible to the normal level even if the readiness for service of the compressor is limited or absent.

One exemplary embodiment and further advantages of the invention are explained in relation to the following figures.

DETAILED DESCRIPTION OF THE DRAWINGS

Figure 1:
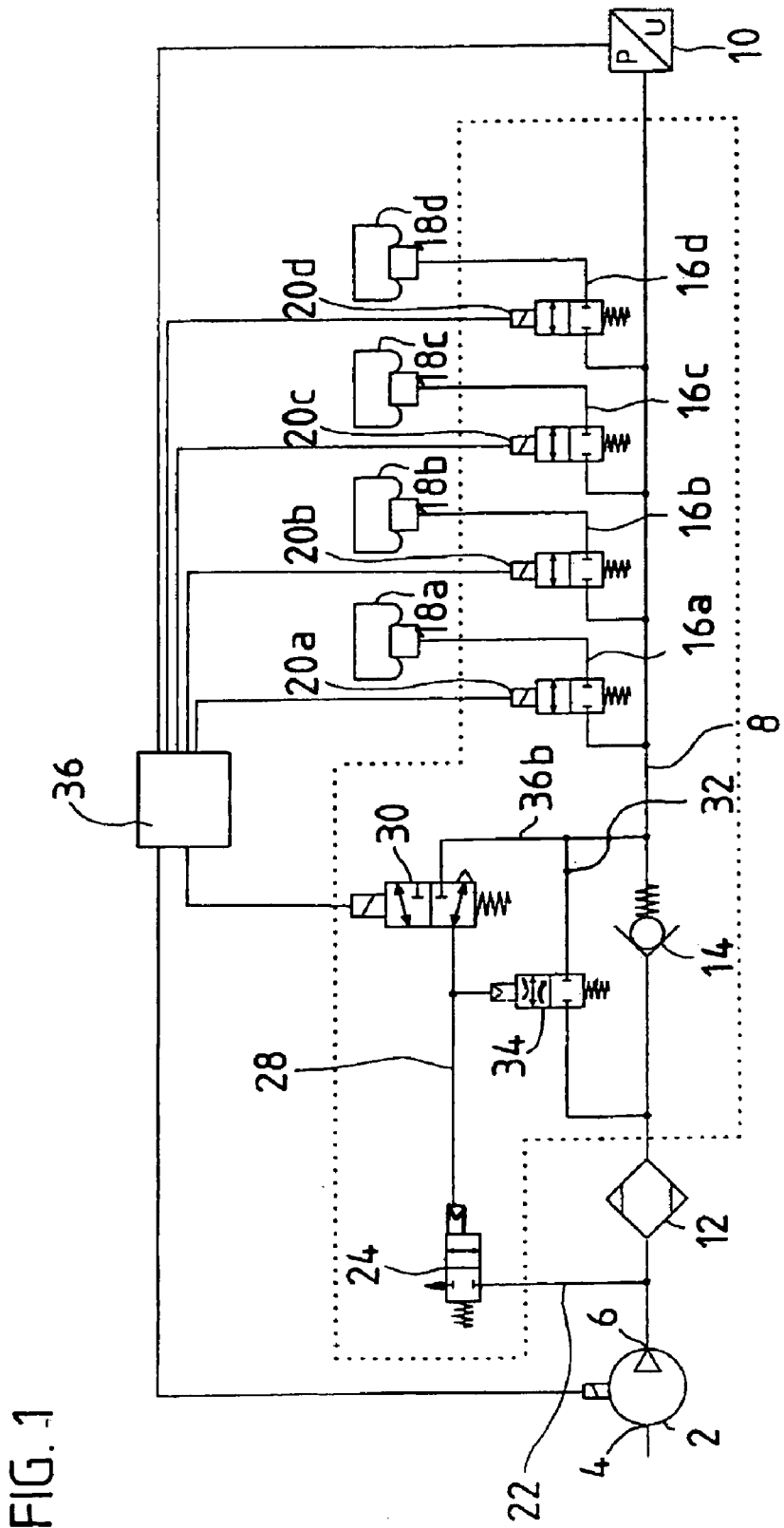
FIG. 1 shows an open level control system.

FIG. 1 shows an open level control system with a compressor 2, which comprises an inlet 4 and an outlet 6. The sensor compressed air line 8 starts at the outlet 6 and ends at a compressed air sensor 10. Located in the sensor compressed air line 8 is an air drier 12 and a nonreturn valve 14, which opens towards the pressure sensor 10. The sensor compressed air line 8 takes the form of a master line, from which compressed air lines 16a to 16d branch off, the latter ending in air springs 18a to 18d. In the compressed air lines 16a to 16d there are located switchable directional control valves 20a to 20d, which in their first switch state shut off the respective compressed air line 16a to 16d and in their second switch state switch through the respective compressed air line 16a to 16d.

Between the outlet 6 of the compressor 2 and the air drier 12, a drain line 22 ending in a switchable directional control valve 24 branches off from the sensor compressed air line 8. In a first switch state the switchable directional control valve 24 shuts off the drain line and in a second switch state it connects it to the atmosphere. The switchable directional control valve 24 takes the form of a pneumatic directional control valve and the pneumatic control input 26 is actuated via the compressed air line 28, in which there is located a switchable directional control valve 30. The nonreturn valve 14 is bypassed by a compressed air line 32, in which there is likewise located a pneumatically switchable directional control valve 34. The electrically switchable directional control valves 20a to 20d and 30 are controlled by the control unit 36 of the level control system. In addition, the compressor 2 is controlled by the control unit 36.

By means of the level control system illustrated in FIG. 1, each individual air spring 18a to 18d may be filled with compressed air to raise the level or emptied into the atmosphere to lower the level. The details of the way this happens are described fully in EP 0 978 397 B1, such that they will not be addressed in any greater detail here.

Furthermore, the level control system may be used to check the readiness for service of the compressor 2 as follows: first of all, all the compressed air lines extending from the outlet 6 of the compressor 2 are shut off (with the exception of the sensor compressed air line 8). In particular, the compressed air lines 16a to 16d to the air springs 18a to 18d are shut off by means of the switchable directional control valves 20a to 20d (which then adopt the switch state shown in FIG. 1). In addition, the compressed air line 28, which branches off from the sensor compressed air line 8, is shut off by means of the switchable directional control valve 30, which then adopts the switch state shown in FIG. 1. As a consequence of the compressed air line 28 being shut off, the drain line 22 is also shut off, since the pneumatically switchable directional control valve 24 cannot be actuated. The switchable directional control valves 20a to 20d and 30 are transferred by the control unit 36 into the switch states shown.

Once the compressed air lines 16a to 16d, 28 and 22 have been shut off, the compressor 2 is actuated by the control unit 36, such that said compressor starts to operate (provided that it is properly connected). Due to its small air volume, pressure builds up rapidly in the sensor compressed air line 8, which connects the outlet 6 of the compressor to the pressure sensor 10. The pressure is measured constantly by the pressure sensor 10 and passed on to the control unit 36. The control unit 36 checks how rapidly the pressure builds up at the pressure sensor 10. The control unit 36 judges the compressor 2 to be ready for service if the pressure buildup per unit time exceeds a threshold value stored in the control unit 36 (for more detail see FIG. 3).

Figure 2:
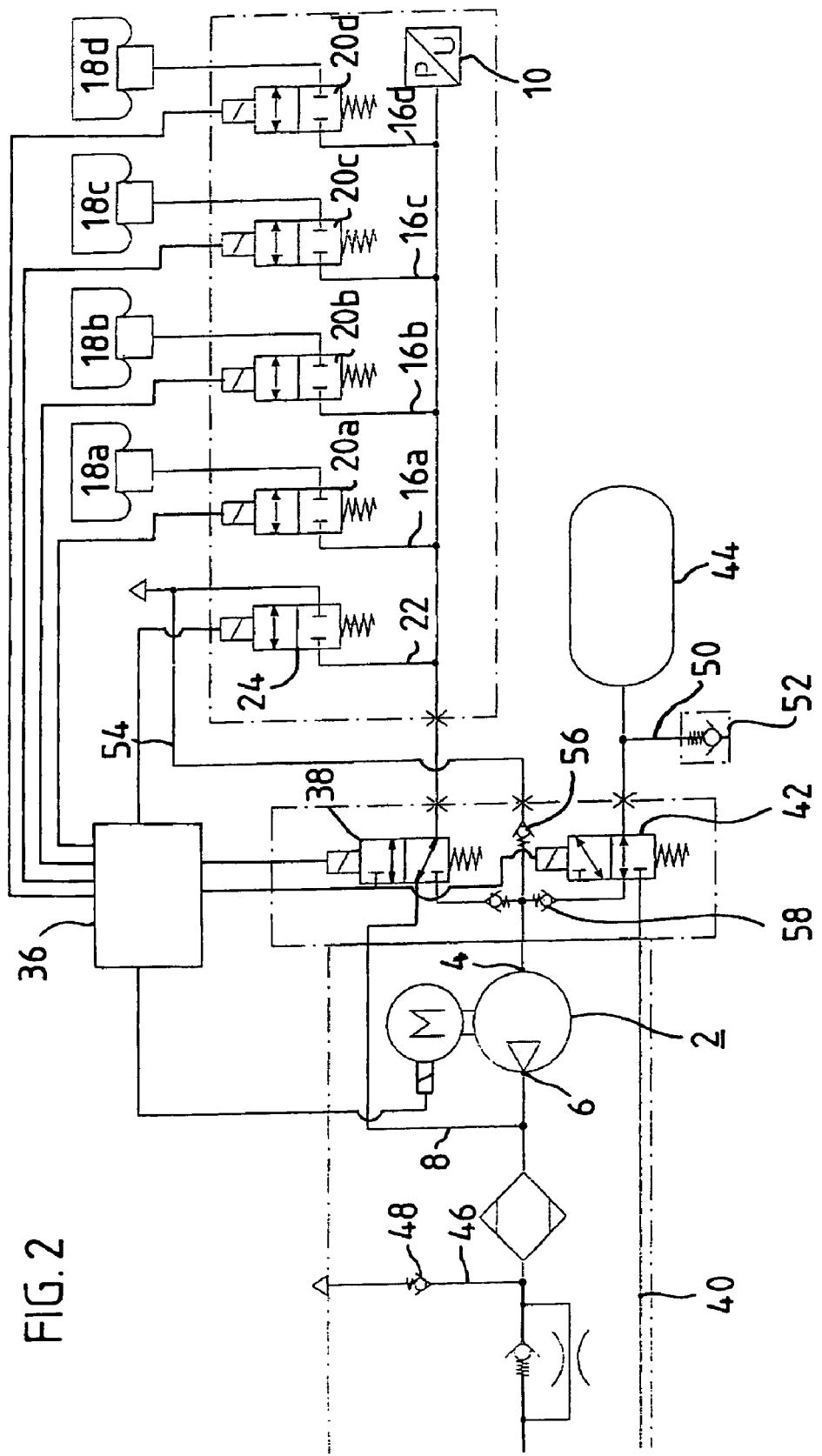
FIG. 2 shows a closed level control system.

FIG. 2 shows a closed level control system, whose structure is known per se known from the prior art and is described fully in EP 1 243 447 A2. Therefore, the structure of the level control system will here only be gone into to the extent necessary for the following explanations. The level control system contains a compressor 2 with an inlet 4 and an outlet 6. A plurality of compressed air lines are connected to the outlet 6 of the compressor 2. For instance, the sensor compressed air line 8 starts from the outlet 6 and ends in the pressure sensor 10. Exactly as in the level control system shown in FIG. 1, the sensor compressed air line 8 also takes the form of a master line, from which compressed air lines 16a to 16d branch off to air springs 18a to 18d, in which are located switchable directional control valves 20a to 20d.

In addition, the drain line 22, in which is located a switchable directional control valve 24, branches off from the sensor compressed air line 8. In addition to the sensor compressed air line 8, the compressed air lines 16a to 16d and the drain line 22, the compressed air line 40 branches off from the outlet 6 of the compressor 2, said compressed air line 40 being connectable to the compressed air accumulator 44 of the closed level control system via a switchable directional control valve 42. A further compressed air line 46, in which is located a pressure relief valve 48 in the form of a nonreturn valve, branches off from the compressed air line 40. In the case of extreme overpressure in the level control system, the compressor 2 may deliver directly into the atmosphere via the compressed air line 46, such that it is not damaged.

In addition, a compressed air line 50 branches off from the compressed air line 40 between the switchable directional control valve 42 and the compressed air accumulator 44, a nonreturn valve 52 which opens towards the compressed air line 40 being located in said compressed air line 50. An external compressed air source may be connected to the compressed air line 50 and be used for initial filling of the compressed air accumulator 44, in order to protect the compressor 2. In addition, the inlet 4 of the compressor 2 is connected directly to the atmosphere via a compressed air line 54. In the compressed air line 54 there is located a nonreturn valve 56, which opens in the direction of the compressor inlet 4. The air springs 18a to 18d may be filled by means of the compressor 2 via the compressed air line 54, if no or too little compressed air is present in the compressed air accumulator 44. In this case, the nonreturn valve 56 opens and the nonreturn valve 58 is automatically shut, such that the compressor 2 draws in compressed air directly from the atmosphere.

Using the level control system illustrated in FIG. 2, the readiness for service of the compressor is checked as follows: Firstly, the outlet 6 of the compressor 2 is connected to the pressure sensor 10 via the sensor compressed air line 8, i.e. the switchable directional control valve 38 adopts the switch state shown in FIG. 2. Then all the other compressed air lines connected to the outlet 6 of the compressor 2, namely the compressed air lines 22, 16a to 16d, 40 and 46, are shut off. This proceeds in that the corresponding switchable directional control valves 24, 20a to 20d and 42 adopt the switch state shown in FIG. 2 or are transferred thereinto by the control unit 36 of the level control system. The compressed air line 46 is shut off automatically by the nonreturn valve 48, since this only opens when an extremely high pressure is built up by the compressor 2. However, it is likewise possible also to shut the compressed air line 46 off separately using a switchable directional control valve (not shown) while the readiness for service of the compressor is being checked.

Once the compressed air lines which extend from the outlet 6 of the compressor have been shut off, the compressor is actuated by the control unit 36, such that it begins to operate if it is ready for service. The compressor then delivers compressed air from the compressed air accumulator 44 (if this has already been filled) or via the compressed air line 54 from the atmosphere (if the compressed air accumulator has not been filled or has been filled to too low a level) via its inlet 4 and its outlet 6 into the sensor compressed air line 8. Because of the small air volume of the sensor compressed air line 8, pressure builds up rapidly therein and accordingly at the pressure sensor 10. The pressure is measured continuously by the pressure sensor 10 and passed on to the control unit 36. The control unit 36 deems the compressor 2 to be ready for service if the pressure increase per unit time exceeds a threshold value stored in the control unit 36 (for more detail see FIG. 3).

Figure 3:
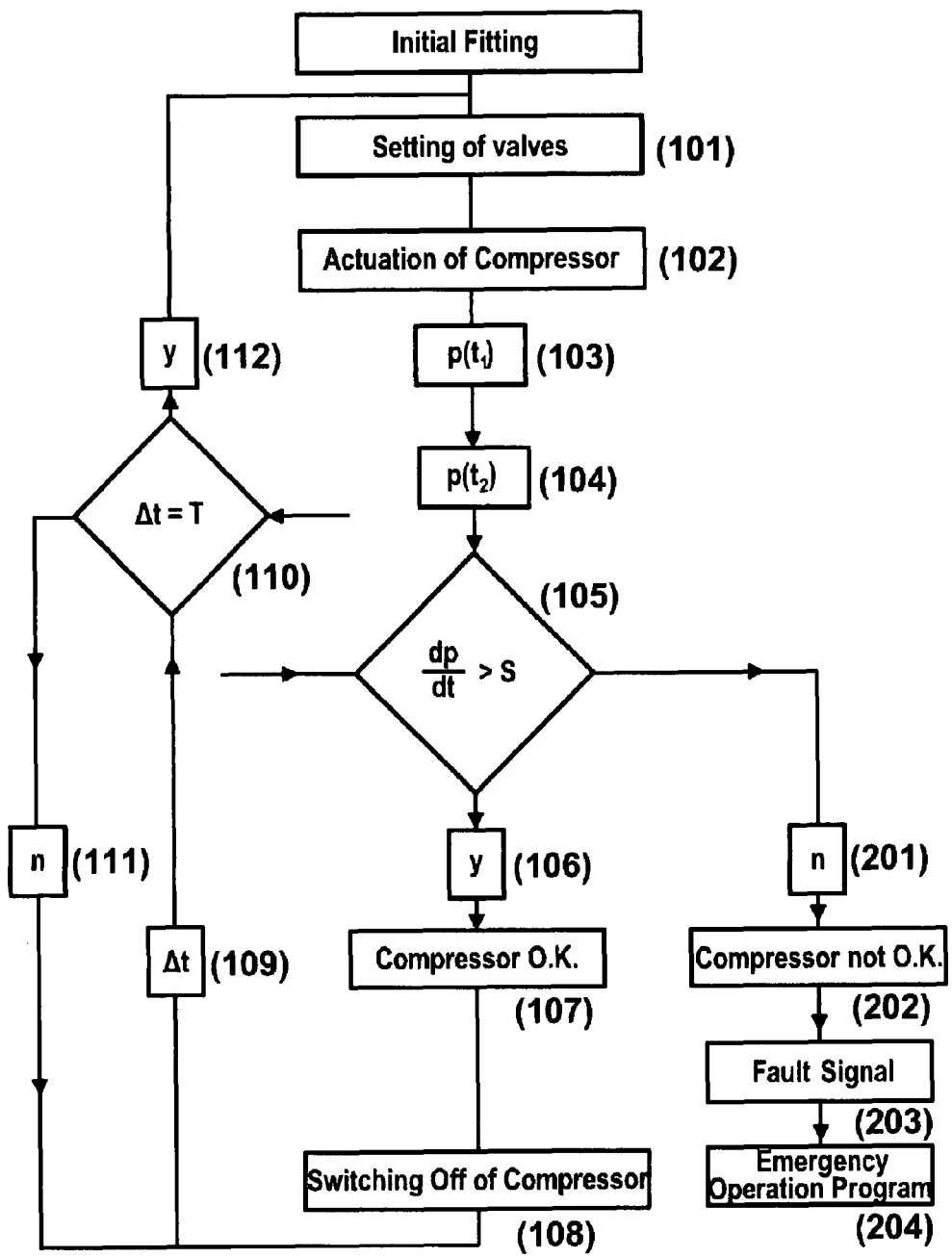
FIG. 3 shows a flow chart.

FIG. 3 shows a flow chart, by means of which the process of checking the readiness for service of the compressor 2, see FIGS. 1 and 2, is explained in greater detail. On initial fitting, a signal may be transmitted to the control unit 36 by means of an external control device, the control unit 36 thereupon carrying out as follows the routine for checking the readiness for service of the compressor:

connecting the sensor compressed air line to the pressure sensor of the level control system and setting the switchable directional control valves of the level control system in such a way that all the other compressed air lines, which are connected to the outlet of the compressor, are shut off (101);

actuating the compressor, such that the latter starts to operate if properly connected (102);

continuously recording the pressures which build up at the pressure sensor (103; 104);

calculating the value $dp/dt = p(t1) - p(t2)/t1 - t2$; wherein $p(ti)$, $i=1, 2$ designate a pressure at the time $ti$ measured by the pressure sensor;

checking whether $dp/dt > S$, wherein S is stored in the control unit (105);

if the condition in method step 105 is met, the control unit deems the compressor of the level control system to be ready for service (106/107);

after method steps 106, 107 the control unit no longer actuates the compressor of the level control system, such that said compressor is switched off (108).

The time between method steps 102 and 108, which corresponds to the compressor operating time and during which checking takes place of the readiness for service of the compressor, amounts to 0.5 to 4 seconds, preferably 0.5 to 2 seconds.

If it is detected in the control unit in method step 105 that $dp/dt \leq S$, the following occurs:

the control unit detects that the threshold value S has not been exceeded and deems the compressor not to be ready for service (201, 202);

the control unit outputs a fault signal and thereafter executes solely an emergency operation program in the level control system until the compressor is again ready for service (203; 204).

Once the readiness for service of the compressor has been checked by the control unit, the method steps 101 to 108 may be performed by the control unit after each repair or servicing of the level control system. In this case too, the checking routine is triggered by an external control device, which transmits a signal to the control unit 36. It is likewise possible to perform the routine of checking the readiness for service of the compressor according to method steps 101 to 108 in the control unit of the level control system whenever the motor vehicle with the level control system undertakes cross-country driving. In this case, the routine is triggered in that specific signals are transmitted to the control unit 36 of the level control system, which indicate cross-country driving by the motor vehicle (e.g. a signal which indicates a step-down ratio).

It is likewise possible to repeat the routine for checking the readiness for service of the compressor according to method steps 101 to 108 at regular motor vehicle operating intervals. This takes place as follows:

- after completion of checking (108), the time $\Delta t$ which has passed since the last check is checked in the control unit (109)
- the time $\Delta t$ is compared with a time T, which is stored in the control unit (110)
- the comparison continues until $\Delta t = T$ (loop 110, 111, 109)
- if the period T has passed, the routine for checking the readiness for service of the compressor is triggered again (101).

LIST OF REFERENCE NUMERALS

Part of the Description

2 Compressor
4 Inlet
6 Outlet
8 Sensor compressed air line
10 Pressure gauge
12 Air drier
14 Nonreturn valve
16a-16d Compressed air line
18a-18d Air springs
20a-20d Switchable directional control valve
22 Drain line
24 Switchable directional control valve
26 Pneumatic control input
28 Compressed air line
30 Switchable directional control valve
32 Compressed air line
34 Switchable directional control valve
36 Control unit
38 Switchable directional control valve
40 Compressed air line
42 Switchable directional control valve
44 Compressed air sensor
46 Compressed air line
48 Nonreturn valve
50 Compressed air line
52 Nonreturn valve
54 Atmospheric line
56, 58 Nonreturn valve

The invention claimed is:

1. A level control system for a motor vehicle, by means of which a vehicle body is spring-suspended relative to at least one vehicle axle and which comprises the following components:

- a compressor (2) with an inlet (4) and an outlet (6),
- air springs (18a-18d), each of which is connected to the outlet (6) of the compressor (2) via a compressed air line (16a-16d), which may be shut off by a switchable directional control valve (20a-20d),
- at least one pressure sensor (10), which is, at least intermittently, connected to the outlet (6) of the compressor (2) via a sensor compressed air line (8),
- wherein the system checks as follows whether the compressor (2) functions properly:
- the pressure sensor (10) is connected to the outlet (6) of the compressor (2) via the sensor compressed air line (8),
- the compressed air lines (16a-16d), which connect the air springs (18a-18d) to the outlet (6) of the compressor (2), are shut off,
- the compressor (2) is switched on,
- the pressure increase at the pressure sensor (10) is measured,
- if the pressure increase per unit time exceeds a predetermined threshold value S, the system determines whether the compressor (2) functions properly,
- after checking whether the compressor (2) functions properly, the compressor (2) is switched off.

2. The level control system for a motor vehicle as claimed in claim 1, wherein the level control system comprises a compressed air accumulator (44), which is connected via a first compressed air line to the inlet (4) of the compressor (2) and via a second compressed air line (40) to the outlet (6) of the compressor (2), wherein during a check whether the compressor (2) functions properly, the system shuts off the second compressed air line using a switchable directional control valve (42) and opens the first compressed air line using a switchable directional control valve (42).

3. The level control system for a motor vehicle as claimed in claim 2, wherein the inlet (4) of the compressor (2) is connected directly to the atmosphere via an atmospheric line (54), in which a first nonreturn valve (56) opening towards the inlet (4) of the compressor (2) is arranged, and wherein the first compressed air line is joined with the atmospheric line (54) at a point between the first nonreturn valve (56) and the inlet (4) of the compressor (2), and wherein a second nonreturn valve (58) opening towards the inlet (4) of the compressor (2) is located in the compressed air line between the compressed air accumulator (44) and the stated point.

4. The level control system for a motor vehicle as claimed in claim 1, wherein from each sensor compressed air line (8) a compressed air line (16a-16d) branches off which includes a switchable directional control valve (20a-20d).

5. The level control system for a motor vehicle as claimed in claim 1, wherein the system checks whether the compressor (2) functions properly during initial fitting of the level control system.

6. The level control system for a motor vehicle as claimed in claim 1, wherein the system checks whether the compressor (2) functions properly after each repair or servicing of the level control system.

7. The level control system for a motor vehicle as claimed in claim 1, wherein the system checks the whether the compressor (2) functions properly as soon as it is identified that the motor vehicle in which the level control system is situated has started cross-country driving.

8. The level control system for a motor vehicle as claimed in claim 1, wherein the system checks whether the compressor (2) functions properly at regular operating intervals of the motor vehicle in which the level control system is situated.

9. The level control system for a motor vehicle as claimed in claim 1, wherein the duration of checking whether the compressor (2) functions properly is limited to 0.5 to 4 seconds.

10. The level control system for a motor vehicle as claimed in claim 1, wherein the control device of the level control system outputs a fault signal if the check finds that the compressor (2) does not function properly.

11. The level control system for a motor vehicle as claimed in claim 1, wherein the level control system is switched to an emergency operation program if the check finds that the compressor (2) does not function properly.

* * * * *